United States Patent [19]

Holman

[11] Patent Number: 5,043,970

[45] Date of Patent: Aug. 27, 1991

[54] SOUND SYSTEM WITH SOURCE MATERIAL AND SURROUND TIMBRE RESPONSE CORRECTION, SPECIFIED FRONT AND SURROUND LOUDSPEAKER DIRECTIONALITY, AND MULTI-LOUDSPEAKER SURROUND

[75] Inventor: Tomlinson Holman, Fairfax, Calif.

[73] Assignee: LucasArts Entertainment Company, San Rafael, Calif.

[21] Appl. No.: 366,991

[22] Filed: Jun. 20, 1989

Related U.S. Application Data

[63] Continuation-in-part of Ser. No. 141,570, Jan. 6, 1988, abandoned.

[51] Int. Cl.[5] .............. G11B 20/02
[52] U.S. Cl. .............. 369/89; 381/20
[58] Field of Search .............. 369/89-92; 381/17-22, 98, 103, 153, 155

[56] References Cited

U.S. PATENT DOCUMENTS

| | | | |
|---|---|---|---|
| 4,204,091 | 5/1980 | Ishigaki et al. | 369/89 |
| 4,251,685 | 2/1981 | Fellgett | 369/89 X |
| 4,332,986 | 6/1982 | Butler | 381/155 |
| 4,410,063 | 10/1983 | Yasue et al. | 381/155 X |
| 4,574,391 | 3/1986 | Morishima | 381/18 |
| 4,577,305 | 3/1986 | Allen et al. | 369/89 X |
| 4,589,129 | 5/1986 | Blackmer et al. | 381/21 |
| 4,596,034 | 6/1986 | Moncrieff . | |
| 4,612,665 | 9/1986 | Inami et al. | 381/98 |
| 4,661,982 | 4/1987 | Kitazato et al. | 381/98 X |
| 4,696,036 | 9/1987 | Julstrom | 381/22 |
| 4,736,426 | 4/1988 | Kinoshita et al. | 381/98 X |
| 4,739,513 | 4/1988 | Kunugi et al. | 381/103 |
| 4,748,669 | 5/1988 | Klayman . | |
| 4,807,217 | 2/1989 | Ide | 369/90 X |
| 4,819,269 | 4/1989 | Klayman . | |
| 4,823,391 | 4/1989 | Schwartz | 381/103 |

OTHER PUBLICATIONS

*dbx CX1 Audio/Video Preamplifier Instruction Manual*, dbx, Inc. 1987.

Harry F. Olson, *Music, Physics and Engineering*, Dover Publications, New York, 2nd ed., 1967, pp. 282-283.

Robert B. Schulein, "In Situ Measurement and Equalization of Sound Reproduction Systems", originally published Apr. 1975, reprinted in *Sound Reinforcement* (anthology), Audio Engineering Society, 1978, pp. B-4-2-B50.

*Audio Pulse Model One Digital Time-Delay System Owner's Manual*, Audio Pulse, Inc., Bedford, MA 1976.

International Standard ISO 2969:1977(E), "Cinematography—Electro-Acoustic Response of Motion-Picture Control Rooms and Indoor Theatres—Specifications and Measurements", *SMPTE Journal*, Jun. 1978, pp. 396-399.

(List continued on next page.)

*Primary Examiner*—Roy N. Envall, Jr.
*Assistant Examiner*—W. R. Young
*Attorney, Agent, or Firm*—Thomas J. Gallagher; Ian Hardcastle

[57] ABSTRACT

Spectral imbalance (alteration in timbre) when playing home video versions of motion pictures is overcome by re-equalization according to a unique correction response curve which compensates for the equalization for playback in large theater-sized auditoriums inherent in motion picture soundtracks. Surround-sound home playback of motion pictures is enhanced by employing main channel loudspeakers that produce generally direct sound fields and surround channel loudspeakers that produce gnerally diffuse sound fields. In addition, the reproduced surround-sound channel is further enhanced by decreasing the interaural cross-correlation of the surround-sound channel sound field and by reducing comb filtering effects in the surround-sound channel at listening positions within the room, preferably by introducing slight pitch shifting in the signals applied to multiple surround loudspeakers. Preferably, further equalization is applied to the reproduced surround channel to compensate for the differences in listener perceived timbre between the surround-sound channel and the main channels.

80 Claims, 5 Drawing Sheets

OTHER PUBLICATIONS

Roy F. Allison and Robert Berkovitz, "The Sound Field in Home Listening Rooms", reprinted in *Loudspeakers*, 2nd Edition (anthology), Audio Engineering Society, 1980.
Henrik Staffeldt and Erik Rasmussen, "The Subjectively-Perceived Frequency Response in Small and Medium-Sized Rooms", *SMPTE Journal*, Jul. 1982, pp. 638-643.
Henrik Staffeldt, "Measurement and Prediction of the Timbre of Sound Reproduction", J. Audio Eng. Soc., vol. 32, No. 6, Jun. 1984, pp. 410-414.
Yoichi Ando, *Concert Hall Acoustics*, Springer-Verlag, New York, 1985, pp. v-ix, 50-59.
David Griesinger, "Spaciousness and Localization in Listening Rooms and Their Effects on the Recording Technique", *J. Audio Eng. Soc.*, vol. 34, No. 4, Apr. 1986, pp. 255-268.
Gunther Theile, "On the Standardization of the Frequency Response of High-Quality Studio Headphones", *J. Audio Eng. Soc.*, vol. 34, No. 12, Dec. 1986, pp. 956-969.
International Standard ISO 2969:1987(E), "Cinematography—B-Chain Electro-Acoustic Response of Motion-Picture Control Rooms and Indoor Theatres—Specifications and Measurements", *SMPTE Journal*, Dec. 1987, pp. 1243-1246.
Stephen Julstrom, "A High-Performance Surround Sound Process for Home Video", 35 *J. Audio Eng. Soc.* 536-549 (1987 Jul./Aug.).

COORDINATES:

REAL AXIS POLE: $(2\pi)$15k RAD/SEC $\alpha_{RP} = -9.4248 \times 10^4$

DID EQUALIZER SECTION: $\omega_0 = (2\pi)\,12.13$k RAD/SEC $\theta_P = 51.88°$ ⟶ $\alpha_P \pm j\beta_P = -4.7046 \times 10^4 \pm j5.9962 \times 10^4$ $\theta_Z = 63.10°$ ⟶ $\alpha_Z \pm j\beta_Z = -3.4485 \times 10^4 \pm j6.7967 \times 10^4$

SOUND SYSTEM WITH SOURCE MATERIAL AND SURROUND TIMBRE RESPONSE CORRECTION, SPECIFIED FRONT AND SURROUND LOUDSPEAKER DIRECTIONALITY, AND MULTI-LOUDSPEAKER SURROUND

CROSS-REFERENCE TO RELATED APPLICATION

This is a continuation-in-part of application Ser. No. 07/141,570, filed Jan. 6, 1988, now abandoned.

BACKGROUND OF THE INVENTION

The invention relates generally to sound reproduction. More specifically, the invention relates to multiple channel sound reproduction systems having improved listener perceived characteristics.

Multiple channel sound reproduction systems which include a surround-sound channel (often referred to in the past as an "ambience" or "special-effects" channel) in addition to left and right (and optimally, center) sound channels are now relatively common in motion picture theaters and are becoming more and more common in the homes of consumers. A driving force behind the proliferation of such systems in consumers' homes is the widespread availability of surround-sound home video software, mainly surround-sound motion pictures (movies) made for theatrical release and subsequently transferred to home video formats (e.g., videocassettes and videodiscs).

Although home video software formats have two-track stereophonic soundtracks, those two tracks carry, by means of amplitude and phase matrix encoding, four channels of sound information—left, center, right, and surround, usually identical to the two-track stereophonic motion-picture soundtracks from which the home video soundtracks are derived. As is also done in the motion picture theater, the left, center, right, and surround channels are decoded and recovered by consumers with a matrix decoder, usually referred to as a "surround-sound" decoder. In the home environment, the decoder is usually incorporated in or is an accessory to a videocassette player, videodisc player, or television set/video monitor. Although nearly universal in motion picture theater environments, the center channel playback is often omitted in home systems. A phantom-image center channel is then fed to left and right loudspeakers to make up for the lack of a center channel speaker.

Motion picture theaters equipped for surround sound typically have at least three sets of loudspeakers, located appropriately for reproduction of the left, center, and right channels, at the front of the theater auditorium, behind the screen. The surround channel is usually applied to a multiplicity of speakers located other than at the front of the theater auditorium.

It is the recommended and common practice in the industry to align the sound system of large auditoriums, particularly a motion picture theater's loudspeaker-room response, to a standardized frequency response curve or "house curve". The current standardized house curve for movie theaters is a recommendation of the International Standards Organization designated as curve X of ISO 2969-1977(E). The use of a standardized response curve is significant because in the final steps of creating motion picture soundtracks, the soundtracks are almost always monitored in large (theater-sized) auditoriums ("mixing" and "dubbing" theaters) whose loudspeaker-room responses have been aligned to the standardized response curve. This is done, of course, with the expectation that such motion picture films will be played in large (theater-sized) auditoriums that have been aligned to the same standardized response curve. Consequently, motion picture soundtracks inherently carry a built-in equalization that takes into account or compensates for playback in large (theater-sized) auditoriums whose loudspeaker-room responses are aligned to the standardized curve.

The current standardized curve, curve X of ISO 2969, is a curve having a significant high-frequency rolloff. The curve is the result of subjective listening tests conducted in large (theater-sized) auditoriums. A basic rationale for such a curve is given by Robert B. Schulein in his article "In Situ Measurement and Equalization of Sound Reproduction Systems", *J. Audio Eng. Soc.*, April 1975, Vol. 23, No. 3, pp. 178–186. Schulein explains that the requirement for high-frequency rolloff is apparently due to the free field (i.e., direct) to diffuse (i.e., reflected or reverberant) sound field diffraction effects of the human head and ears. A distant loudspeaker in a large listening room is perceived by listeners as having greater high frequency output than a closer loudspeaker, if aligned to measure the same response. This appears to be a result of the substantial diffuse field to free field ratio generated by the distant loudspeaker; a loudspeaker close to a listener generates such a small diffuse to direct sound ratio as to be insignificant.

More recently the rationale has been carried further by Gunther Theile ("On the Standardization of the Frequency Response of High-Quality Studio Headphones", *J. Audio Eng. Soc.*, December 1986, Vol. 34, No. 12, pp. 956–969) who hypothesized that perceptions of loudness and tone color (timbre) are not completely determined by sound pressure and spectrum in the auditory canal. Theile relates this hypothesis to the "source location effect" or "sound level loudness divergence" ("SLD") which occurs whenever auditory events with differing locations are compared: a nearer loudspeaker requires more sound level (sound pressure) at the ear drums to cause the same perceived sound loudness as a more distant loudspeaker and the effect is frequency dependent.

It has also been recognized that the sound pressure level in a free (direct) field exceeds that in a diffuse field for equal loudness. A standard equalization, currently embodied in ISO 454-1975 (E) of the International Standards Organization, is intended to compensate for the differences in perceived loudness and, by extension, timbre due to frequency response changes between such sound fields.

Perceived sound loudness and timbre thus depends not only on the location at which sound fields are generated with respect to the listener but also on the relative diffuse (reflected or reverberant) field component to free (direct) field component ratio of the sound field at the listener.

One major difference between the home listening environment and the motion picture theater listening environment is in the relative sizes of the listening rooms—the typical home listening room, of course, being much smaller. While there is no established standard curve to which home sound systems are aligned, the high-frequency rolloff house curve applicable to large auditoriums is not applicable to the considerably smaller home listening room because of the above-mentioned effects.

Unlike home video software media having soundtracks transferred from motion picture film soundtracks, recorded consumer software sound media (e.g., vinyl phonograph records, cassette tapes, compact discs, etc.) have a built-in equalization that compensates for typical home listening room environments. This is because during their preparation such recordings are monitored in relatively small (home listening room sized) monitoring studios using loudspeakers which are the same or similar to those typically used in homes. Relative to large auditorium theater environments, the response of a typical modern home listening room-loudspeaker system or a small studio listening room-loudspeaker system can be characterized as substantially "flat", particularly in the high-frequency region in which rolloff is applied in the large auditorium house curve. A consequence of these differences is that motion pictures transferred to home video software media have too much high-frequency sound when reproduced by a home system. Consequently, the musical portions of motion picture soundtracks played on home systems tend to sound "bright". In addition, other undesirable results occur—"Foley" sound effects, such as the rustling of clothing, etc., which tend to have substantial high-frequency content, are over-emphasized. Also, the increased high-frequency sensitivity of home systems often reveals details in the makeup of the soundtrack that are not intended to be heard by listeners; for example, changes in soundtrack noise level as dialogue tracks are cut in and out. These same problems, of course, occur when a motion picture soundtrack is played back in any small listening environment having consumer-type loudspeakers, such as small monitoring studios.

There is yet another difference between the home sound systems and motion picture theater sound systems that detracts from creating a theater-like experience in the home. It has been the practice at least in certain high-quality theater sound systems to employ loudspeakers that provide a substantially directional sound field for the left, center, and right channels and to employ loudspeakers that provide a substantially non-directional sound field for the surround channel. Such an arrangement enhances the perception of sound localization as a result of the directional front loudspeakers while at the same time enhancing the perception of ambience and envelopment as a result of the non-directional surround loudspeakers.

In contrast, home systems typically employ main channel (left and right channel) loudspeakers designed to generate a compromise sound field that is neither extremely directional nor extremely non-directional. Surround channel loudspeakers in the home are usually down-sized versions of the main channel loudspeakers and generate sound fields similar to those of the main channel loudspeakers. In the home environment, little or no attention has been given to the proper selection of directional characteristics for the main channel and surround channel speakers.

Also, in both home and theater systems, including the above-mentioned high-quality theater sound systems, no compensation has been employed for the differences in listener perceived timbre between the main channels and the surround channel. For example, sounds which move from the main channels to the surround channel or vice-versa (sounds "panned" off or onto the viewing screen) undergo timbral shifts. Such shifts in timbre can be so severe as to harm the ability of the listener to believe that the sound is coming from the same sound source as the sound is panned.

The inventor has discovered that the aforementioned equalization standard, currently embodied in ISO 454-1975 (E) of the International Standards Organization, cannot be used as a basis to properly compensate for the listener perceived timbre differences between the main and surround channels.

The inventor believes that there are two main causes for the listener perceived timbral shift between the main and surround channels. The first is timbre changes due to comb filtering. Comb filtering may arise from the operation of multiple surround loudspeakers or from deliberately added electronic comb filters used to simulate a surround array with only two loudspeakers. The second cause is frequency response differences due to the human head related transfer function. In addition, the difference in character between the direct sound field generated by the main channel loudspeakers and the diffuse sound field generated by the surround channel loudspeakers may be an additional factor.

In addition, with respect to home systems and to the above-mentioned high quality theater sound systems, a single (monophonic) surround-sound channel is applied to multiple loudspeakers (usually two, in the case of the home, located to the left and right at the sides or rear of a home listening room and usually more than two, in the case of a motion-picture theater, located on the side and rear walls). The result of driving the two sides of the head with the same signal is that the surround-sound channel sounds to a listener seated on the center line as though it were in the middle of the head.

SUMMARY OF THE INVENTION

Aspects of the present invention are directed primarily to surround-sound reproduction systems in relatively small listening rooms, particularly those in homes. With respect to such, the invention solves the problem of spectral imbalance (e.g., alteration in timbre), particularly excessive high-frequency energy, when playing pre-recorded sound material that is equalized for playback in a large (theater-sized) auditorium whose room-loudspeaker system is aligned to a frequency response curve having a significant high-frequency rolloff. In a preferred embodiment, re-equalization according to a correction curve is provided in the playback system in order to restore to a "flat" response the perceived spectral balance of recordings transferred from motion picture soundtracks having an inherent high-frequency boost because of their intended playback in large (theater-sized) auditoriums aligned to the standard house curve. Such re-equalization restores the spectral distribution (timbre) intended by the creators of the pre-recorded sound material.

With respect to small (home-sized) listening rooms, a further aspect of the invention is to generate generally directional sound fields in response to the left and right sound channels and in response to the center sound channel, if used, and to generate a generally non-directional sound field in response to the surround-sound channel.

A directional sound field is one in which the free (direct) component of the sound field is predominant over the diffuse component at listening positions within the listening room. A nondirectional sound field is one in which the diffuse component of the sound field is predominant over the free (direct) component at listening positions within the listening room. Directionality of a sound field depends at least on the Q of the loudspeaker or loudspeakers producing the sound field ("Q" is a measure of the directional properties of a loudspeaker), the number of loudspeakers, the size and characteristics of the listening room, the manner in which the loudspeaker (or loudspeakers) is (or are) acoustically coupled to (e.g., positioned with respect to) the listening room, and the listening position within the room. For example, multiple high-Q (directional) loudspeakers can be distributed so as to produce a non-directional sound field within a room. Also, the directionality of multiple loudspeakers reproducing the same channel of sound can be affected by their physical relationship to one another and differences in amplitude and phase of the signal applied to them.

This aspect of the invention is not concerned per se with specific loudspeakers nor with their acoustic coupling to small listening rooms, but rather it is concerned, in part, with the generation of direct and diffuse sound fields for the main (left, right, and, optionally, center) channels and for the surround channel, respectively, in a small (home-sized) room surround-sound system using whatever combinations of available loudspeakers and techniques as may be required to generate such sound fields. This aspect of the invention recognizes that excellent stereophonic imaging and detail combined with sonic envelopment of the listeners can be achieved not only in large (theater-sized) auditoriums but also in the small (home-sized) listening room by generating generally direct sound fields for the main channels and a generally diffuse sound field for the surround channel. In this way, the home listening experience can more closely re-create the quality theater sound experience.

According to a further aspect of the invention, the overall listening impression can be improved even further, for small listening rooms, by the addition of equalization to compensate for the differences in listener perceived timbre between the main channels and the surround channel. As mentioned above, the inventor believes that there are two principal causes for listener perceived timbral shift between the main and surround channels: timbre changes due to comb filtering and frequency response differences due to the human head related transfer function.

Comb filtering can be greatly reduced or substantially suppressed in small listening rooms, as provided in a further aspect of the invention next described, by using only two surround loudspeakers and by decorrelating the surround channel information applied to the two speakers by employing a preferred decorrelation technique.

When the timbral differences between the main and surround channels due to combing effects are removed, as by the next described aspect of the invention, then human head related frequency response differences become the most noticeable factor. According to this aspect of the invention, surround channel equalization is provided, for use in a system in which combing effects have been removed, to more closely match the listener perceived surround channel timbre and the listener perceived main channel timbre.

According to yet a further aspect of the invention, the listener's impression of the surround-sound channel can be improved, for all sizes of listening rooms, by decreasing the interaural cross-correlation of the surround-sound channel sound field at listening positions within the room (that is, by "decorrelation"). Preferably, this is accomplished by a technique such as slight pitch shifting between multiple surround loudspeakers, which does not cause undesirable side effects. While this aspect of the invention may be employed without the aforementioned generation of generally direct sound fields for the main channels and a generally diffuse sound field for the surround channel, the combination of these aspects of the invention provides an even more psychoacoustically pleasing listening experience. Preferably, the combination further includes the aspect of the invention providing for surround channel equalization to compensate for the listener perceived difference in timbre between main and surround sound channels. This aspect of this invention constitutes the preferred means to reduce combing effects as required by the surround channel equalization aspect of the invention.

DETAILED DESCRIPTION OF THE INVENTION

Figure 1:
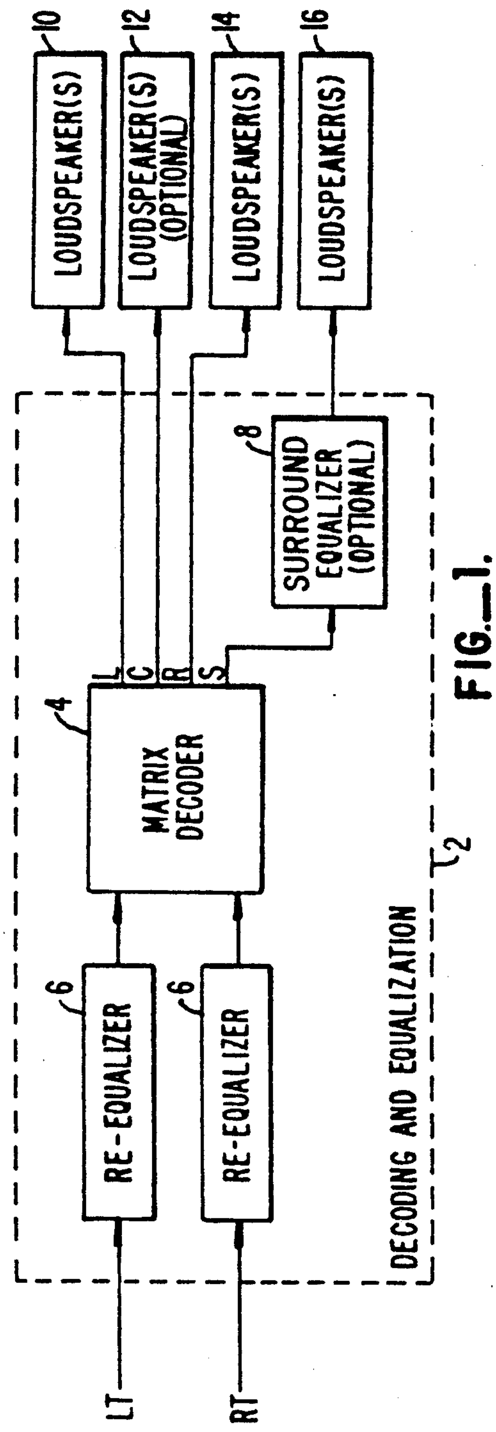
FIG. 1 is a block diagram of a surround-sound reproduction system embodying aspects of the invention.
Figure 2:
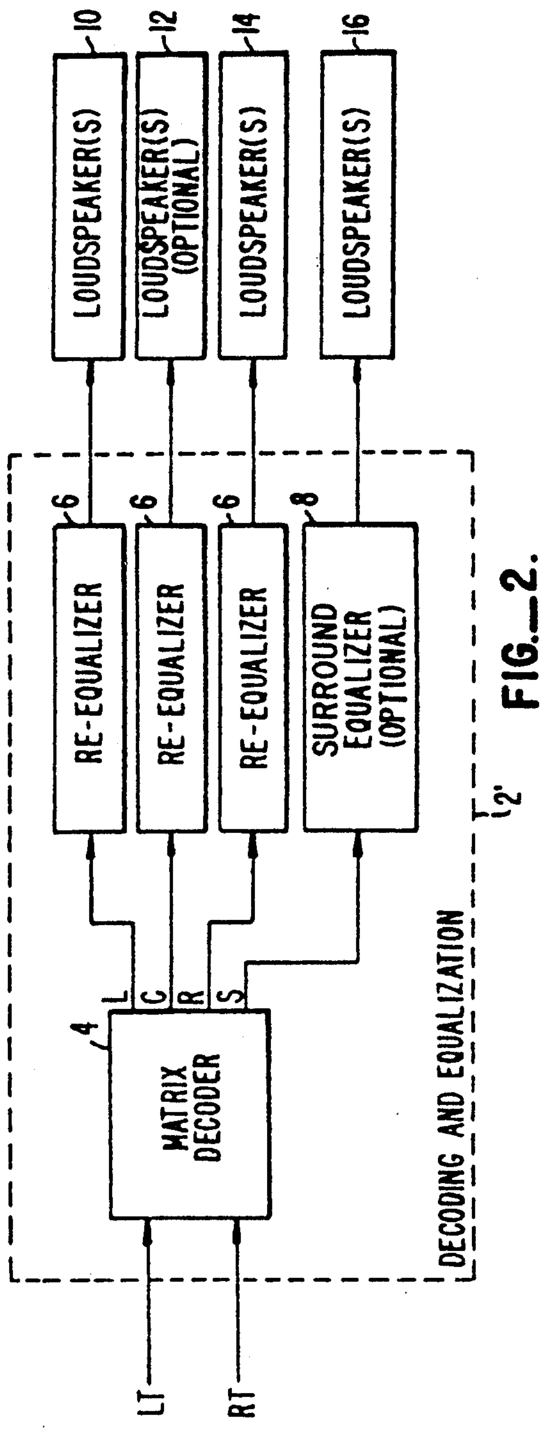
FIG. 2 is a block diagram of a surround-sound reproduction system embodying aspects of the invention.

FIGS. 1 and 2 show, respectively, block diagrams of two surround sound reproduction systems embodying aspects of the invention. FIGS. 1 and 2 are generally equivalent, although, for reasons explained below, the arrangement of FIG. 2 is preferred. Throughout the specification and drawings, like elements generally are assigned the same reference numerals; similar elements are generally assigned the same reference numerals but are distinguished by prime (') marks.

In both FIGS. 1 and 2, left (L), center (C), right (R), and surround (S) channels, matrix encoded, according to well-known techniques, as left total (LT) and right total (RT) signals, are applied to decoding and equalization means 2 and 2', respectively. Both decoding and equalization means 2 and 2' include a matrix decoder that is intended to derive the L, C, R, and S channels from the applied LT and RT signals. Such matrix decoders, often referred to as "surround sound" decoders are well-known. Several variations of surround sound decoders are known both for professional motion picture theater use and for consumer home use. For example, the simplest decoders include only a passive matrix, whereas more complex decoders also include a delay line and/or active circuitry in order to enhance channel separation. In addition, many decoders include a noise reduction expander because most matrix encoded motion picture soundtracks employ noise reduction encoding in the surround channel. It is intended that the matrix decoder 4 include all such variations.

In the embodiment of FIG. 1, re-equalizer means 6 are placed in the respective LT and RT signal input lines to the matrix decoder 4, whereas in the embodiment of FIG. 2, the re-equalizer means 6 are located in the L, C, and R output lines from the matrix decoder 4. The function of the re-equalizer means 6 are explained below. In both the FIG. 1 and FIG. 2 embodiments, an optional surround channel equalizer means 8 is located in the S output line from the matrix decoder 4. The function of the surround channel equalizer means 8 is also explained below.

In both embodiments, the L, C, R, and S outputs from the decoding and equalization means 2 feed a respective loudspeaker or respective loudspeakers 10, 12, 14, and 16. In home listening environments the center channel loudspeaker 12 is frequently omitted (some matrix decoders intended for home use omit entirely a center channel output). Suitable amplification is provided as necessary, but is not shown for simplicity.

The arrangements of both FIGS. 1 and 2 thus provide for the coupling of at least the left, right, and surround (and, optionally, the center) sound channels encoded in the LT and RT signals to a respective loudspeaker or loudspeakers. The loudspeakers are intended to be located in operating positions with respect to a listening room in order to generate sound fields responsive to at least the left, right, and surround (and, optionally, the center) channels within the listening room.

Because of the requirement to accurately preserve relative signal phase of the LT and RT input signals for proper operation of the matrix decoder 4, which responds to amplitude and phase relationships in the LT and RT input signals, the placement of the re-equalizing means 6 (a type of filter, as explained below) before the decoder 4, as in the embodiment of FIG. 1, is less desirable than the alternative location after the decoder 4 shown in the embodiment of FIG. 2. In addition, the re-equalizing means 6, if placed before decoder 4, may affect proper operation of the noise reduction expander, if one is employed, in the matrix decoder 4. The arrangement of FIG. 2 is thus preferred over that of FIG. 1. The preferred embodiment of re-equalizer means 6 described below assumes that they are located after the matrix decoder 4 in the manner of the embodiment of FIG. 2. If the re-equalizer means 6 are located before the matrix decoder 4 in the manner of FIG. 1 it may be necessary to modify their response characteristics in order to minimize effects on noise reduction decoding that may be included in the matrix decoder 4 and, also, it may be necessary to carefully match the characteristics of the two re-equalizer means 6 (of the FIG. 1 embodiment) in order to minimize any relative shift in phase and amplitude in the LT and RT signals as they are processed by the re-equalizer means 6.

Figure 3:
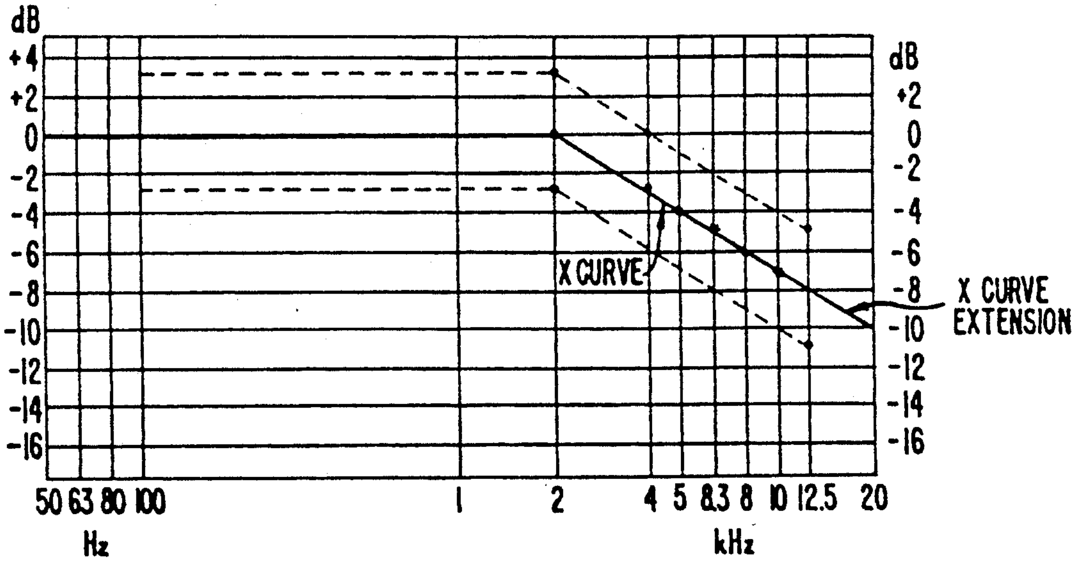
FIG. 3 is a loudspeaker-room response curve used by theaters, curve X of the International Standard ISO 2969-1977(E), extrapolated to, 20 kHz.

FIG. 3 shows curve X of the International Standard ISO 2969-1977(E) with the response extrapolated to 20 kHz, beyond the official 12.5 kHz upper frequency limit of the standard. It is common practice in many theaters, particularly dubbing theaters and other theaters equipped with high quality surround sound systems, to align their response to an extended X characteristic. The extended X curve is a de facto industry standard. The X characteristic begins to roll off at 2 kHz and is down 7 dB at 10 kHz. The extended curve is down about 9 dB at 16 kHz, the highest frequency employed in current alignment procedures for dubbing theaters. In public motion picture theaters, which are larger than dubbing theaters, the X curve is extended only to 12.5 kHz because the high frequency attenuation of sound in the air becomes a factor above about 12.5 kHz in such large auditoriums. The X curve, and particularly its extension, are believed by some in the industry to be too rolled off at very high frequencies. In contrast to the X curve and the extended X curve, a good quality modern home consumer sound system, although not aligned to a specific standard, tends not to exhibit such a high-frequency room-loudspeaker response roll off. Relative to the X curve and extended X curve, modern home consumer systems may be characterized as relatively flat at high frequencies.

As explained above, in the creation of a motion picture soundtrack, the soundtrack is usually monitored in a theater that has been aligned to the extended X response curve, with the expectation that such motion picture films will be played in theaters that have been aligned to that standardized response curve. Thus, motion picture soundtracks inherently carry a built-in equalization that takes into account or compensates for playback in theater-sized auditoriums whose loudspeaker-room response is aligned to the standardized curve. However, for the reasons discussed above, this built-in equalization is not appropriate for playback in home listening environments: the soundtracks of motion pictures transferred to home video software media have too much high frequency sound energy when reproduced by a home system. Correct timbre is not preserved and details in the soundtrack can be heard that are not intended to be heard.

Figure 4:
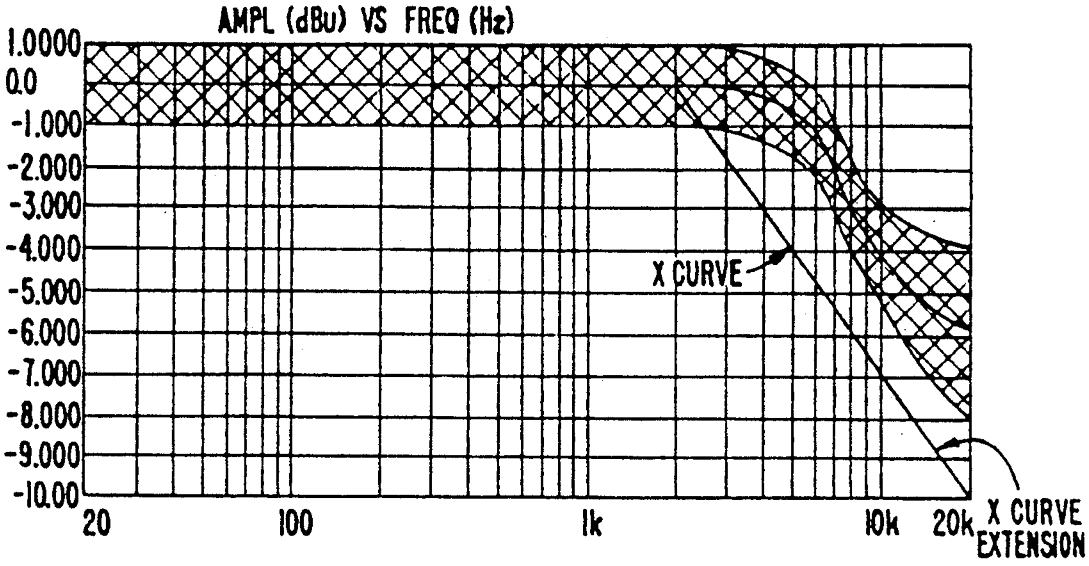
FIG. 4 is a correction curve, according to one aspect of this invention, to compensate for the large room equalization inherent in motion picture soundtracks when played back in small listening rooms.

According to one aspect of this invention, a correction curve is provided to compensate for the large room equalization inherent in motion picture soundtracks when played back in small listening rooms. The correction curve was empirically derived using a specialized commercially-available acoustic testing manikin. The correction curve is a difference curve derived from measurements of steady-state one-third octave sound level spectra taken in representative extended X curve aligned large auditoriums in comparison to a good quality modern home consumer loudspeaker-room sound system. The correction curve is shown in FIG. 4 as a cross-hatched band centered about a solid line central response characteristic. The correction band takes into account an allowable tolerance in the correction of about ±1 dB up to about 10 kHz and about ±2 dB from about 10 kHz to 20 kHz, where the ear is less sensitive to variation in response. In practice, the tolerance for the initial flat portion of the characteristic, below about 2 kHz, may be tighter. The form of the correction curve band is generally that of a low-pass filter with a shelving response: the correction is relatively flat up to about 4 to 5 kHz, exhibits a roll off, and again begins to flatten out above about 10 kHz. About 3 to 5 dB roll off is provided at 10 kHz. The extended X curve response is also shown in FIG. 4 for reference. As mentioned above, the X curve, and particularly its extension are believed by some in the industry to be too rolled off at very high frequencies. It will be appreciated that the optimum correction curve would change in the event that a modified X curve standard is adopted and put into practice.

Figure 5:
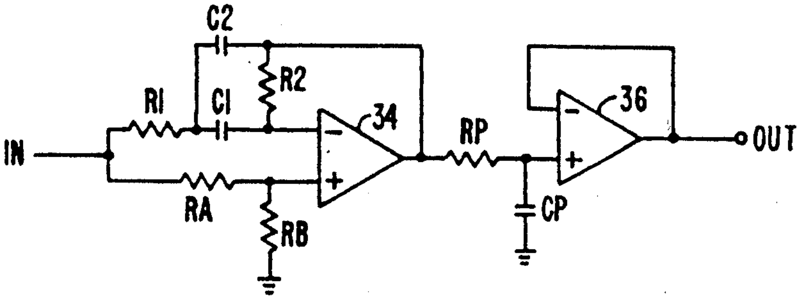
FIG. 5 is a schematic circuit diagram showing the preferred embodiment of a filter/equalizer for implementing the correction curve of FIG. 4.

A filter/equalizer circuit can be implemented by means of an active filter, such as shown in FIG. 5, to provide a transfer characteristic closely approximating the solid central line of the correction curve band of FIG. 4. The correct frequency response for the filter/equalizer is obtained by the combination of a simple real pole and a "dip" equalizer section. The real pole is realized by a single RC filter section with a −3 dB frequency of 15 kHz. The dip equalizer is a second order filter with a nearly flat response. The transfer function of the section is:

$$\frac{s^2 + \gamma\frac{\omega_o}{Q} + \omega_o^2}{s^2 + \frac{\omega_o}{Q} + \omega_o^2}$$

The complex pole pair and the complex zero pair have the same radian frequency but their angles are slightly different giving the desired dip in the frequency response with minimum phase shift. The same dip could be achieved with the zeros in the right half plane, but the phase shift would be closer to that of an allpass filter—180 degrees at the resonant frequency. The parameters of the dip section in the filter/equalizer are:

of=12.33kHz

Q=0.81

$\gamma$=0.733 where of=$2\pi\omega$. Another way of interpreting these parameters is that the Q of the poles is 0.81 and the Q of the zeros is $$\frac{0.81}{\gamma}$$

The dip section can be realized by a single operational amplifier filter stage and six components as shown in FIG. 5. The filter stage in effect subtracts a bandpass filtered signal from unity giving the required transfer function and frequency response shape. The circuit topology, one of a class of single operational amplifier biquadratic circuits, is known for use as an allpass filter (*Passive and Active Network Analysis and Synthesis* by Aram Budak, Houghton Mifflin Company, Boston, 1974, page 451).

The rectangular coordinates of the poles and zeros of the overall filter equalizer are as follows (units are radians/sec in those locations on the s-plane):

| |
|---|
| Real Pole: |
| $\alpha_{rp} = -9.4248 \times 10^4$ |
| Complex Poles: |
| $\alpha_p \pm j\beta_p = -4.7046 \times 10^4 \pm j5.9962 \times 10^4$ |
| Complex Zeros: |
| $\alpha_z \pm j\beta_z = -3.4485 \times 10^4 \pm j6.7967 \times 10^4$ |

Figure 6:
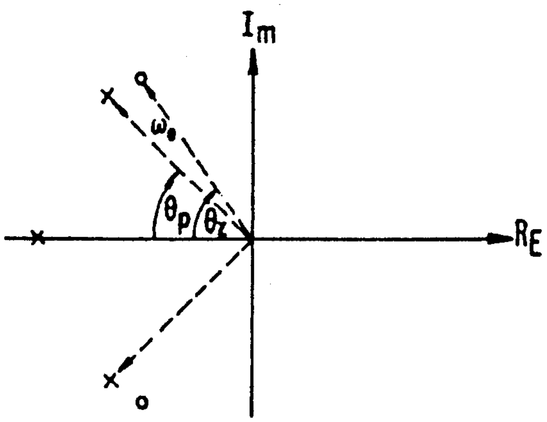
FIG. 6 is a diagram in the frequency domain showing the locations of the poles and zeros on the s-plane of the filter/equalizer, of FIG. 5.

FIG. 6 shows the location of the poles and zeros on the s-plane.

When implemented with the preferred component values listed below, the resulting characteristic response of the filter/equalizer circuit of FIG. 5 is:

| Frequency Hz | Response, dB |
|---|---|
| 20 | 0 |
| 100 | 0 |
| 500 | 0 |
| 1,000 | 0 |
| 2,000 | −0.2 |
| 3,150 | −0.4 |
| 4,000 | −0.7 |
| 5,000 | −1.1 |
| 6,300 | −1.8 |
| 8,000 | −2.8 |
| 10,000 | −4.2 |
| 12,500 | −5.2 |
| 16,000 | −5.4 |
| 20,000 | −5.7 |

As mentioned above, there is an allowable tolerance of about ±1 dB up to about 10 kHz and about 12 dB from about 10 kHz to 20 kHz. The preferred component values of the circuit shown in FIG. 5 are as follows:

| Component | 5% tolerance | 1% tolerance |
|---|---|---|
| R1 | 6K8 | 6K81 (6.81 kilohms) |
| R2 | 18K | 17K4 |
| C1 = C2 | 1.2N | 1.2N (1.2 nanofarads) |
| RA | 2K2 | 2K00 |
| RB | 10K | 10K0 |
| RP | 4K7 | 4K87 |
| CP | 2.2N | 2.2F |

The filter/equalizer circuit of FIG. 5 is one practical embodiment of the re-equalizer means 6 of FIG. 2. Many other filter/equalizer circuit configurations are possible within the teachings of the invention.

Referring again to the embodiments of FIGS. 1 and 2, the loudspeaker or loudspeakers 10, 12 (if used), and 14 are preferable directional loudspeakers that generate, when in their operating positions in the listening room, left, center (if used), and right channel sound fields in which the free (direct) sound field component is predominant over the diffuse sound field component of each sound field at listening positions within the listening room. The loudspeaker or loudspeakers 16 is (or are) preferably non-directional so as to generate, when in its or their operating positions in the listening room, a surround channel sound field in which the diffuse sound field component is predominant over the free (direct) sound field component at listening positions within the listening room. A non-directional sound field for reproducing the surround channel can be achieved in various ways. Preferably, one or more dipole type loudspeakers each having a generally figure-eight radiation pattern are oriented with one of their respective nulls generally toward the listeners. Other types of loudspeakers having a null in their radiation patterns can also be used. Another possibility is to use a multiplicity of speakers having low directivity arranged around the listeners so as to create an overall sound field that is diffuse. Thus, depending on their placement in the listening room and their orientation with respect to the listening positions, even directional loudspeakers are capable of producing a predominantly diffuse sound field.

In order to obtain the full sonic benefits of directional and non-directional speakers as just set forth, it is preferred that the arrangements of the FIG. 1 and FIG. 2 embodiments use the optional surround channel equalizer 8. Such an equalizer compensates for the differences in listener perceived timbre between the main and surround channels. The use of a surround channel equalizer with the directional and non-directional speakers as just set forth is applicable to small (home) listening rooms.

The following table shows the data for implementing the characteristic response of the desired correction to compensate for the listener perceived timbre between the main and surround channels. The correction curve was empirically derived using a specialized commercially-available acoustic testing manikin. The correction curve is a difference curve derived from measurements of steady-state one-third octave sound level spectra in a small listening room between a front loudspeaker position compared to a side loudspeaker position, as is common for center and surround loudspeakers in a surround sound system. The positions were measured with an instrumentation microphone and the acoustic testing manikin. The differences between the measurement microphone and the manikin data were subtracted to eliminate the effects of the specific room and loudspeaker.

| Frequency, Hz | Response, dB |
|---|---|
| 1000 | 0 |
| 1163 | −1.5 |
| 1332 | −2.4 |
| 1525 | −2.2 |
| 1746 | −1.7 |
| 2000 | −1.3 |
| 2290 | −2.6 |
| 2622 | −2.7 |
| 3002 | −3.2 |
| 3438 | −5.0 |
| 3936 | −4.3 |
| 4507 | −2.8 |
| 5161 | −2.3 |
| 5910 | −4.2 |
| 6767 | −5.8 |
| 7749 | −5.6 |
| 8873 | −3.6 |
| 10161 | −1.8 |
| 11634 | −2.0 |
| 13322 | 0 |
| 15254 | +0.5 |
| 17467 | +1.4 |
| 20000 | −1.0 |

There is an allowable tolerance of about ±2 dB up to about 10 kHz and about ±4 dB from about 10 kHz to 20 kHz.

Figure 7:
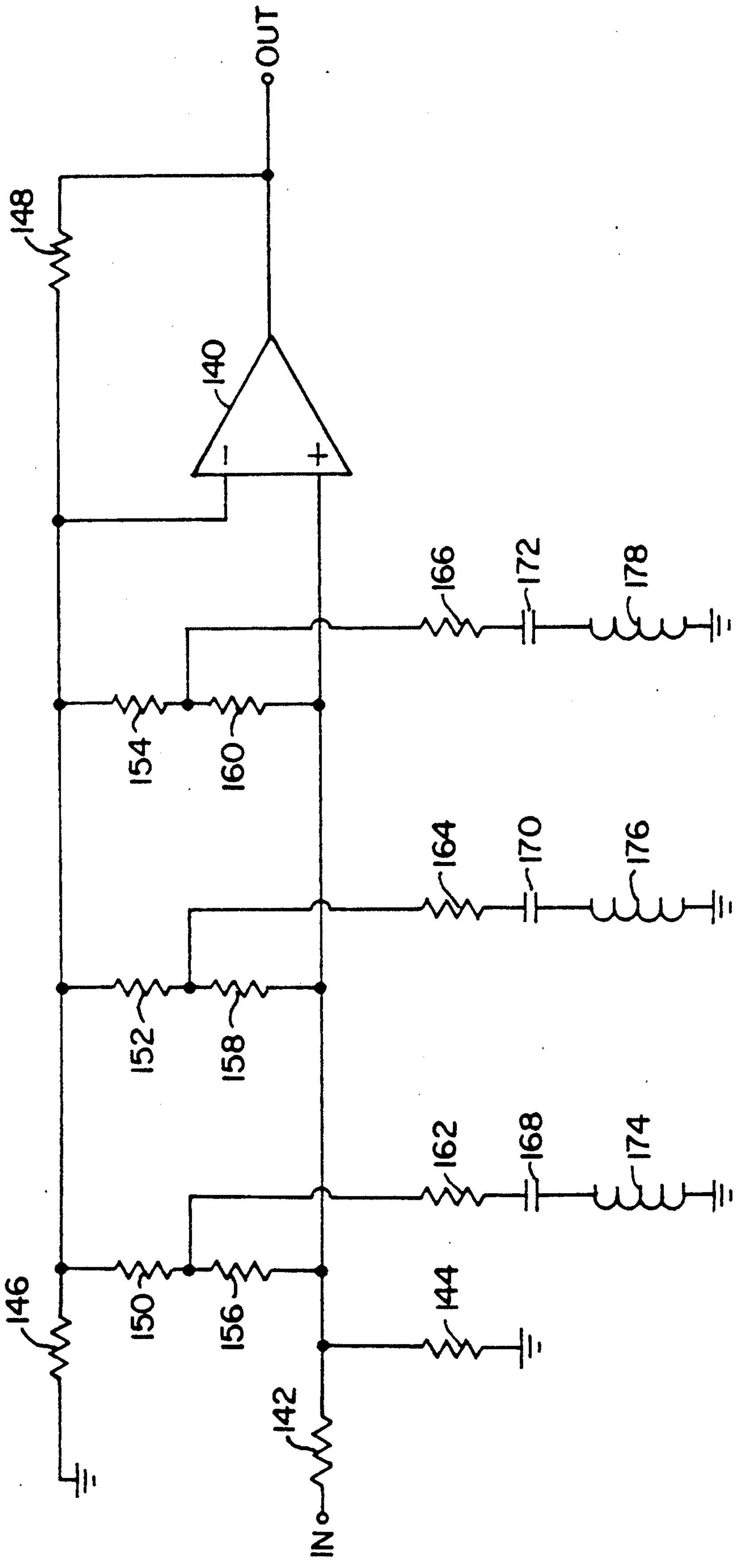
FIG. 7 is a schematic circuit diagram showing the preferred embodiment of a surround channel equalizer for implementing the characteristic response of the desired correction to compensate for the listener perceived timbre between the main and surround channels.

The preferred embodiment of the surround channel equalizer 8, described below in connection with FIG. 7, is an active filter/equalizer circuit that substantially implements (within about 1 dB) the correction data set forth in the table just above. It will be noted that the correction data extends up to 20 kHz even though the frequency response of the surround channel in the standard matrix surround sound system is limited to about 7 kHz by a low-pass filter. The surround channel equalizer described in connection with FIG. 7 is intended for applications in which a 7 kHz low-pass filter is not present in the surround channel. In practical applications where the 7 kHz low-pass filter is present, it is preferred that the overall transfer function of the surround channel equalizer 8 and the low-pass filter combine so as to substantially implement the correction data to the extent possible in view of the high-frequency roll off of the low-pass filter. The design and implementation of such an equalizer is well within the ordinary skill in the art.

FIG. 7 shows a schematic diagram of a practical embodiment of the surround channel equalizer 8 that implements (within about 1 dB) the correction data set forth in the table above. The equalizer 8 is embodied in a three-section resonant active filter/equalizer circuit. The circuit has a single operational amplifier 140 configured as a differential amplifier with frequency-dependent impedances between its positive and negative-going inputs. The impedances are each tuned series LCR circuits connected between the midpoint of respective voltage divider resistors and a reference ground. The preferred component values of the circuit shown in FIG. 7 are as follows:

| Component | Value |
|---|---|
| 142 | 10K ohms |
| 144 | 10K |
| 146 | 10K |
| 148 | 10K |
| 150 | 2.2K |
| 152 | 4300 |
| 154 | 1.8K |
| 156 | 1250 |
| 158 | 1200 |
| 160 | 2K |
| 162 | 1K |
| 164 | 1K |
| 166 | 1K |
| 168 | 10N (nanofarads) |
| 170 | 9N |
| 172 | 5N |
| 174 | 300M (millihenries) |
| 176 | 75M |
| 178 | 150M |

The equalizer circuit of FIG. 7 is one practical embodiment of the equalizer means 8 of FIGS. 1 and 2. Many other filter/equalizer circuit configurations are possible within the teachings of the invention.

In a modification of the embodiments of FIGS. 1 and 2, the monophonic surround-sound channel advantageously may be split, by appropriate de-correlating means, into two channels which, when applied to first and second surround loudspeakers or groups of loudspeakers, provide two surround channel sound fields having low-interaural cross-correlation with respect to each other at listening positions within a small (home) listening room. Preferably, each of the two de-correlated surround channel sound fields is generated by a single loudspeaker and those two loudspeakers are located, respectively, at the sides of the listening room. Alternatively, the two loudspeakers may be located at the rear of the listening room. The use of more than a single loudspeaker to generate each field makes it more difficult to match the timbre of the surround channel sound field to that of the main (left, center, and right) channel sound fields. This as believed to be the result of a comb filter effect produced when more than two loudspeakers are used to generate each of the de-correlated surround channel sound fields. As mentioned above, this aspect of the invention is particularly useful in combination with the surround channel equalization aspect of the invention, which requires the reduction or substantial suppression of comb filter effects.

It has previously been established that human perception favors dissimilar sound present at the two ears insofar as the reverberant energy in a listening room is concerned. In order to provide such a dissimilarity when using matrix audio surround-sound technology, added circuitry is needed beyond simple encoding and decoding, since only a monaural surround track is encoded. In principle this circuitry may employ various known techniques for synthesizing stereo from a monaural source, such as comb filtering. However, many of these techniques produce undesirable audible side effects. For example, comb filters suffer from audible "phasiness", which can readily be distinguished by careful listeners. In addition, electronic comb filtering is undesirable because it contributes to listener perceived timbre differences between the main and surround channels.

Preferably, the decorrelation circuitry used in the practical embodiment of this aspect of the invention employs small amounts of frequency or pitch shifting, which is known to be relatively unobtrusive to critical listeners. Pitch shifting, for example, is currently used, besides as an effect, to allow the increase of gain before feedback in public address systems, where it is not easily noticed, the amount of such shifts being small, in the order of a few Hertz. A 5 Hz shift is employed in a modulation-demodulation circuit for this purpose described in "A Frequency Shifter for Improving Acoustic Feedback Stability", by A. J. Prestigiacomo and D. J. MacLean, reprinted in *Sound Reinforcement, An Anthology*, Audio Engineering Society, 1978, pp. B-6–B-9.

Frequency or pitch shifting may be accomplished by any of the well-known techniques for doing so. In addition to the method described in the Prestigiacomo and MacLean article, as noted in the *Handbook for Sound Engineers, the New Audio Cyclopedia*, Howard W. Sams & Co. First Edition, 1987, page 626, delay can form the basis for frequency shift: the signal is applied to the memory of the delay at one rate (the original frequency) and read out at a different rate (the shifted frequency).

The surround channel signal is applied to two paths. At least one path is processed by a pitch shifter. Preferably, the frequency or pitch shift is fixed and is small, sufficient to psychoacoustically de-correlate the sound fields without audibly degrading the sound: in the order of a few Hertz. Although more complex arrangements are possible, they may not be necessary. For example, pitch shifting could be provided in both paths and the pitch could be shifted in a complementary fashion, with one polarity of shift driving the surround channel signal in one path up in frequency, and the other driving the signal in the other path downward in frequency. Other possibilities include varying the pitch shift by varying the clocking of a delay line. The shift could be varied in accordance with the envelope of the surround channel audio signal (e.g., under control of a circuit following the surround channel audio signal having a syllabic time constant—such circuits are well known for use with audio compressors and expanders).

Although either analog or digital delay processing may be employed, the lower cost of digital delay lines suggests digital processing, particularly the use of adaptive delta modulation (ADM) for which relatively inexpensive decoders are available. Conventional pulse code modulation (PCM) also may be used. Although waveform discontinuities ("splices") occur at the signal block sample junctions as the output signal from the delay line is reconstructed whether ADM or PCM is used, such splices tend to be inaudible in the case of ADM because the errors are single bit errors. In the case of PCM, special signal processing is likely required to reduce the audibility of the splices. According to the above cited *Handbook for Sound Engineers*, several signal-processing techniques have successfully reduced the audibility of such "splices".

Figure 8:
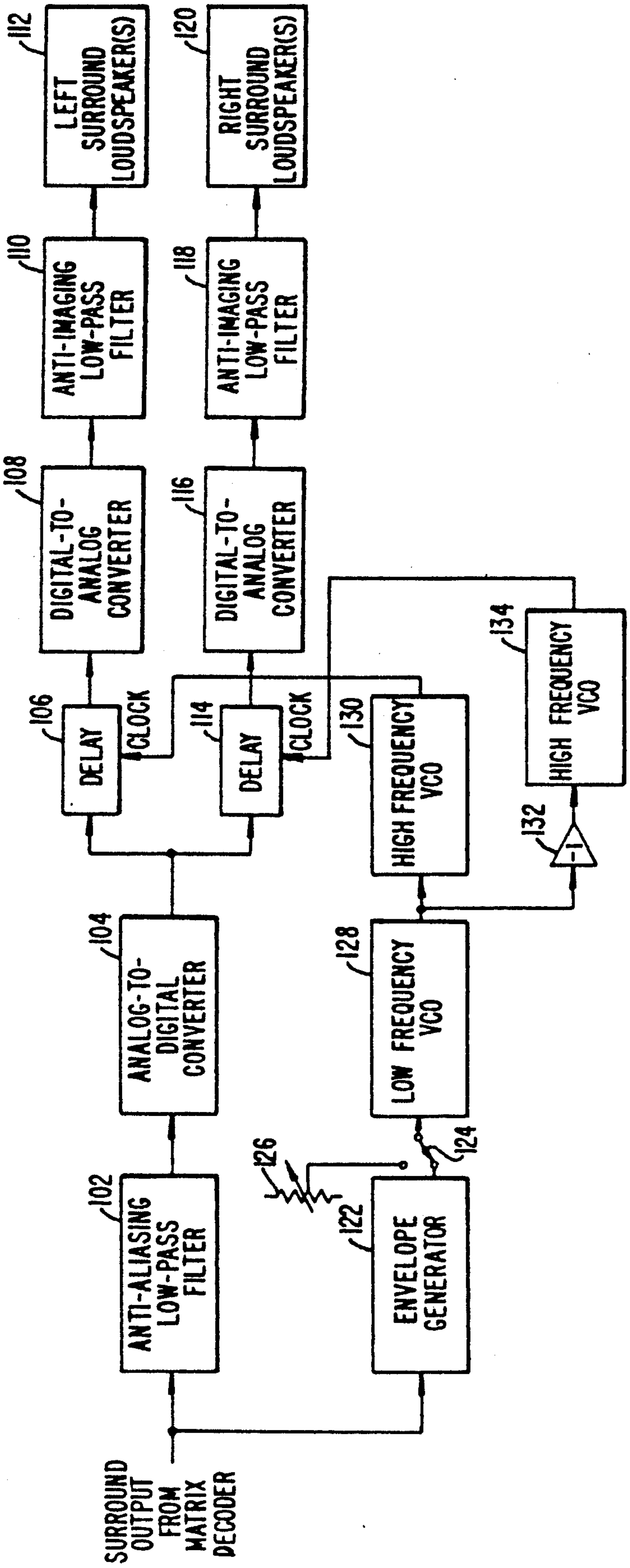
FIG. 8 is a block diagram showing an arrangement for deriving, by means of pitch shifting, two sound outputs from the surround-sound channel capable of providing, according to another aspect of the invention, sound fields having low-interaural cross-correlation at listening positions.

Referring to FIG. 8, the surround output from matrix decoder 4 (optionally, via surround channel equalizer 8) of FIGS. 1 or 2 provides the input to the decorrelator which is applied to an anti-aliasing low-pass filter 102 in the signal processing path and to an envelope generator 122 in the control signal path. The filtered input signal is then applied to an analog-to-digital converter (preferably, ADM) 104, the digital output of which is applied to two paths that generate, respectively, the left surround and right surround outputs. The assignment of the "left" and "right" paths is purely arbitrary and the designations may be reversed. The paths are the same and include a clocked delay line 106 (114), a digital-to-analog converter 108 (116) and an anti-imaging low-pass filter 110 (118).

The control signal for controlling the pitch shift by means of altering the clocking of the delay lines 106 and 114 is fixed or variable, according to the position of switch 124, which selects the input to a very low frequency voltage controlled oscillator (VCO) 128 either from the envelope generator 122, which follows the syllabic rate of the surround channel audio signal, or from a fixed source, shown as a variable resistor 126. VCO 128 operates at a very low frequency, less than 5 Hz. The output of the low frequency VCO 128 is applied directly to a high frequency VCO 130 which clocks delay line 106 in the left surround path and is also inverted by inverter 132 for application to a second high frequency VCO 134 which clocks delay line 114 in the right surround path. When there is no output from the low frequency VCO 128, the two high frequency VCOs are set to the same frequency (in the megahertz range, the exact frequency depending on the clock rate required for the delay lines, which in turn depends on the digital sampling rate selected). The low frequency oscillator 128 modulates the high frequency oscillators, producing complementary pitch shifts.

Alternatively, the decorrelator of FIG. 8 may be simplified so that the surround output from the matrix decoder is applied without processing in a first path to either the left surround loudspeaker(s) 112 or right surround loudspeaker(s) 120. The other path is applied to the other of the loudspeaker(s) via frequency or pitch shift processing, preferably fixed, including anti-aliasing low-pass filter 102, analog-to-digital converter 104, delay 106, digital-to-analog converter 108, anti-imaging low-pass filter 110. Delay 106 is controlled as shown in FIG. 8, preferably with switch 124 selecting the fixed input from potentiometer 126. The amount of frequency shifting required in this variation in which the pitch is shifted only in one channel is about twice that provided to each of the paths in the embodiment of FIG. 8.

The output of the paths is applied (through suitable amplification), respectively, to one (preferably) or a group of left surround loudspeakers 112 and to one (preferably) or a group of right surround loudspeakers 120. The loudspeakers should be arranged so that they generate first and second sound fields generally to the left (side and/or rear) and right (side and/or rear) of listening positions within the listening room. The aforementioned techniques regarding the generation of a predominantly diffuse sound field are preferably applied to the decorrelated surround.

I claim:

1. A sound system for reproducing the sound information in a plurality of sound channels, including left and right sound channels, in a relatively small room, such as in a home, wherein said sound information is equalized for reproduction in a large auditorium whose room-loudspeak system is aligned to a response curve having a high-frequency roll off, comprising loudspeaker means for generating, when located in its or their operating positions with respect to the room, in response to first and second input signals, first and second sound fields at listening positions within the room, and means for coupling, including means for coupling said left and right sound channels, as said first and second input signals, to said loudspeaker means, said means for coupling said left and right sound channels including frequency response correcting means for correcting the frequency response of said left and right sound channels to compensate for errors that result from reproducing said large auditorium equalized sound information in said small room, said frequency response correcting means comprising a circuit having a transfer characteristic of a filter having a shelving response such that its characteristic response is relatively flat up to about 4 or 5 kHz, rolls off between about 4 to 5 kHz and about 10 kHz, and is relatively flat above about 10 kHz.

2. The system of claim 1 wherein said system for reproducing the sound information in a plurality of sound channels is also for reproducing a surround sound channel, said system further comprising additional loudspeaker means for generating, when located in its or their operating positions with respect to the room, in response to a third input signal, a third sound field at listening positions within the room, and wherein said means for coupling also includes means for coupling said surround sound channel, as said third input signal, to said additional loudspeaker means.

3. The system of claim 2 wherein the sound information in said plurality of sound channels is carried in left total and right total signals, and said means for coupling includes decoding means for generating signals representing said left, right, and surround sound channels in response to said left total and right total signals.

4. The system of claim 3 wherein said left total and right total signals are processed by said frequency response correcting means before said signals are applied to said decoding means.

5. The system of claim 3 wherein said decoding means processes said left total and right total signals and said frequency response correcting means processes the multiple sound channel outputs of said decoding means.

6. The system of claim s 2, 3, 4 or 5 wherein said additional loudspeaker means includes first and second additional loudspeaker means, and said means for coupling said surround sound channel further includes decorrelating means for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, and couples said two surround signals to said first and second additional loudspeaker means.

7. The system of claim 6 wherein said characteristic response, subject to a tolerance of about ±1 dB up to about 10 kHz and about ±2 dB from about 10 kHz to 20 kHz, is:

| Hz | dB | Hz | dB |
|---|---|---|---|
| 20 | 0.0 | 5k | −1.1 |
| 100 | 0.0 | 6k | −1.8 |
| 500 | 0.0 | 8k | −2.8 |
| 1k | 0.0 | 10k | −4.2 |
| 2k | −0.2 | 12k | −5.2 |
| 3k15 | −0.4 | 16k | −5.4 |
| 4k | −0.7 | 20k | −5.7. |

8. The system of claim 2 wherein said first and second sound fields each have a direct sound field component and a diffuse sound field component, the direct sound field component of each said sound field being predominant over the diffuse sound component of said sound field at listening positions within the room, and said third sound field has a direct sound component and a diffuse sound component, the diffuse sound component of said third sound field being predominant over the direct sound field component of said third sound field at listening positions within the room.

9. The system of claim 8 wherein said means for coupling said surround channel to said additional loudspeaker means includes surround sound channel frequency response correcting means for correcting the frequency response of the surround sound channel to compensate for the listener perceived difference in timbre between the surround sound channel and the other sound channels.

10. The system of claim 9 wherein the frequency response of said surround sound channel frequency response correcting means, subject to a tolerance of about ±2 dB up to about 10 kHz and about ±4 dB from about 10 kHz to 20 kHz, is:

| Hz | dB | Hz | dB |
|---|---|---|---|
| 1000 | 0.0 | 5161 | −2.3 |
| 1163 | −1.5 | 5910 | −4.2 |
| 1332 | −2.4 | 6767 | −5.8 |
| 1525 | −2.2 | 7749 | −5.6 |
| 1746 | −1.7 | 8873 | −3.6 |
| 2000 | −1.3 | 10161 | −1.8 |
| 2290 | −2.6 | 11634 | −2.0 |
| 2622 | −2.7 | 13322 | 0.0 |
| 3002 | −3.2 | 15254 | +0.5 |
| 3438 | −5.0 | 17467 | +1.4 |
| 3936 | −4.3 | 20000 | −1.0 |
| 4507 | −2.8. | | |

11. The system of claim 9 wherein said surround sound channel frequency response correcting means includes decorrelating means for reducing the comb filter effect produced when the surround channel is reproduced by a plurality of loudspeaker means.

12. The system of claim 8 wherein said additional loudspeaker means includes first and second additional loudspeaker means, and said means for coupling said surround sound channel further includes decorrelating means for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, and couples said two surround signals to said first and second additional loudspeaker means.

13. The system of claim 12 wherein said means for coupling said surround channel to said additional loudspeaker means includes surround sound channel frequency response correcting means for correcting the frequency response of the surround sound channel to compensate for the listener perceived difference in timbre between the surround sound channel and the other sound channels.

14. The system of claim 13 wherein the frequency response of said surround sound channel frequency response correcting means, subject to a tolerance of about ±2 dB up to about 10 kHz and about ±4 dB from about 10 kHz to 20 kHz, is:

| Hz | dB | Hz | dB |
|---|---|---|---|
| 1000 | 0.0 | 5161 | −2.3 |
| 1163 | −1.5 | 5910 | −4.2 |
| 1332 | −2.4 | 6767 | −5.8 |
| 1525 | −2.2 | 7749 | −5.6 |
| 1746 | −1.7 | 8873 | −3.6 |
| 2000 | −1.3 | 10161 | −1.8 |
| 2290 | −2.6 | 11634 | −2.0 |
| 2622 | −2.7 | 13322 | 0.0 |
| 3002 | −3.2 | 15254 | +0.5 |
| 3438 | −5.0 | 17467 | +1.4 |
| 3936 | −4.3 | 20000 | −1.0 |
| 4507 | −2.8. | | |

15. The system of claim 13 wherein said decorrelating means is for reducing the comb filter effect produced when the surround channel is reproduced by a plurality of loudspeaker means.

16. The system of claim 15 wherein said decorrelating means includes means for shifting the pitch of said two surround signals with respect to each other.

17. The system of claim 1 wherein said system for reproducing the sound information contained in a plurality of sound channels is also for reproducing a center sound channel, said loudspeaker means generating, when located in its or their operating positions with respect to the room, in response to a further input signal, a further sound field at listening positions within the room, and said means for coupling also including means for coupling said center sound channel, as said further input signal, to said loudspeaker means, said means for coupling said center sound channel to said loudspeaker means including frequency response correcting means for correcting the frequency response of said center sound channel to compensate for errors that result from reproducing said large auditorium equalized sound information in said small room, said frequency response, correcting means comprising a circuit having a transfer characteristic of a filter with a shelving response such that its characteristic response is relatively flat up to about 4 to 5 kHz, rolls off between about 4 to 5 kHz and about 10 kHz, and is relatively flat above about 10 kHz.

18. The system of claim 17 wherein the sound information in said plurality of sound channels is carried in left total and right total signals, and said means for coupling includes decoding means for generating signals representing said left, right, and center sound channels in response to said left total and right total signals.

19. The system of claim 18 wherein said left total and right total signals are processed by the frequency response correcting means before said signals are applied to said decoding means.

20. The system of claim 18 wherein said decoding means processes said left total and right total signals and said frequency response correcting means processes the multiple sound channel outputs of said decoding means.

21. The system of claim 17 wherein said system for reproducing the sound information contained in said plurality of sound channels is also for reproducing a surround sound channel, said system further comprising additional loudspeaker means for generating, when located in its or their operating positions with respect to the room, in response to a fourth input signal, a fourth sound field at listening positions within the room, and wherein said means for coupling includes means for coupling said surround sound channel, as said fourth signal, to said additional loudspeaker means.

22. The system of claim 21 wherein the sound information in said plurality of sound channels is carried in left total and right total signals, and said means for coupling includes decoding means for generating signals representing said left, center, right, and surround sound channels in response to said left total and right total signals.

23. The system of claim 22 wherein said left total and right total input signals are processed by the frequency response correcting means before said signals are applied to said decoding means.

24. The system of claim 22 wherein said decoding means processes said left total and right total input signals and said frequency response correcting means processes the multiple sound channel outputs of said decoding means.

25. The system of claims 2–5, 21–23 or 24 wherein said additional loudspeaker means includes first and second additional loudspeaker means, and said means for coupling said surround sound channel further includes decorrelating means for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, and couples said two surround signals to said first and second additional loudspeaker means.

26. The system of claim 25 wherein said decorrelating means includes means for shifting the pitch of said two surround signals with respect to each other.

27. The system of claims 21, 22, 23, or 24 wherein said additional loudspeaker means includes first and second additional loudspeaker means, and said means for coupling said surround said channel further includes decorrelating means for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, and couples said two surround signals to said first and second additional loudspeaker means.

28. The system of claim 27 wherein said characteristic response, subject to a tolerance of about ±1 dB up to about 10 kHz and about ±2 dB from about 10 kHz to 20 kHz, is:

| Hz | dB | Hz | dB |
|---|---|---|---|
| 20 | 0.0 | 5k | −1.1 |
| 100 | 0.0 | 6k | −1.8 |
| 500 | 0.0 | 8k | −2.8 |
| 1k | 0.0 | 10k | −4.2 |
| 2k | −0.2 | 12k | −5.2 |
| 3k15 | −0.4 | 16k | −5.4 |
| 4k | −0.7 | 20k | −5.7. |

29. The system of claim 21 wherein said first, second, and further sound fields each have a direct sound field component and a diffuse sound field component, the direct sound field component of each said sound field being predominant over the diffuse sound component of said sound field at listening positions within the room, and said third sound field has a direct sound component and a diffuse sound component, the diffuse sound component of said third sound field being predominant over the direct sound field component of said third sound field at listening positions within the room.

30. The system of claim 29 wherein said means for coupling said surround channel to said additional loudspeaker means includes surround sound channel frequency response correcting means for correcting the frequency response of the surround sound channel to compensate for the listener perceived difference in timbre between the surround sound channel and the other sound channels.

31. The system of claim 30 wherein the frequency response of said surround sound channel frequency response correcting means, subject to a tolerance of about ±2 dB up to about 10 kHz and about ±4 dB from about 10 kHz to 20 kHz, is:

| Hz | dB | Hz | dB |
|---|---|---|---|
| 1000 | 0.0 | 5161 | −2.3 |
| 1163 | −1.5 | 5910 | −4.2 |
| 1332 | −2.4 | 6767 | −5.8 |
| 1525 | −2.2 | 7749 | −5.6 |
| 1746 | −1.7 | 8873 | −3.6 |
| 2000 | −1.3 | 10161 | −1.8 |
| 2290 | −2.6 | 11634 | −2.0 |
| 2622 | −2.7 | 13322 | 0.0 |

-continued

| Hz | dB | Hz | dB |
|---|---|---|---|
| 3002 | −3.2 | 15254 | −0.5 |
| 3438 | −5.0 | 17467 | −1.4 |
| 3936 | −4.3 | 20000 | −1.0 |
| 4507 | −2.8. | | |

32. The system of claim 30 wherein said surround sound channel frequency response correcting means includes decorrelating means for reducing the comb filter effect when the surround channel is reproduced by a plurality of loudspeaker means.

33. The system of claim s 1-5, 8, 10-12, 17-24 or 30 wherein said characteristic response, subject to a tolerance of about ±1 dB up to about 10 kHz and about ±2 dB from about 10 kHz to 20 kHz, is:

| Hz | dB | Hz | dB |
|---|---|---|---|
| 20 | 0.0 | 5k | −1.1 |
| 100 | 0.0 | 6k | −1.8 |
| 500 | 0.0 | 8k | −2.8 |
| 1k | 0.0 | 10k | −4.2 |
| 2k | −0.2 | 12k | −5.2 |
| 3k15 | −0.4 | 16k | −5.4 |
| 4k | −0.7 | 20k | −5.7. |

34. The system of claim 30 wherein said additional loudspeaker means includes first and second additional loudspeaker means, and said means for coupling said surround sound channel further includes decorrelating means for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, and couples said two surround signals to said first and second additional loudspeaker means.

35. The system of claim 34 wherein said means for coupling said surround channel to said additional loudspeaker means includes surround sound channel frequency response correcting means for correcting the frequency response of the surround sound channel to compensate for the listener perceived difference in timbre between the surround sound channel and the other sound channels.

36. The system of claim 35 wherein the frequency response of said surround sound channel frequency response correcting means, subject to a tolerance of about ±2 dB up to about 10 kHz and about ±4 dB from about 10 kHz to 20 kHz, is:

| Hz | dB | Hz | dB |
|---|---|---|---|
| 1000 | 0.0 | 5161 | −2.3 |
| 1163 | −1.5 | 5910 | −4.2 |
| 1332 | −2.4 | 6767 | −5.8 |
| 1525 | −2.2 | 7749 | −5.6 |
| 1746 | −1.7 | 8873 | −3.6 |
| 2000 | −1.3 | 10161 | −1.8 |
| 2290 | −2.6 | 11634 | −2.0 |
| 2622 | −2.7 | 13322 | 0.0 |
| 3002 | −3.2 | 15254 | −0.5 |
| 3438 | −5.0 | 17467 | −1.4 |
| 3936 | −4.3 | 20000 | −1.0 |

-continued

| Hz | dB | Hz | dB |
|---|---|---|---|
| 4507 | −2.8. | | |

37. The system of claim 35 wherein said decorrelating means is for reducing the comb filter effect produced when the surround channel is reproduced by a plurality of loudspeaker means.

38. The system of claim 37 wherein said decorrelating means includes means for shifting the pitch of said two surround signals with respect to each other.

39. A sound system for reproducing the sound information in a plurality of sound channels, including left, right and surround sound channels, in a relatively small room, such as in a home, wherein said sound information is equalized for reproduction in a large auditorium whose room-loudspeaker system is aligned to a response curve having a high-frequency roll off, comprising loudspeaker means for generating, when located in its or their operating positions with respect to the room, in response to first and second input signals, first and second sound fields at listening positions within the room, first and second additional loudspeaker means for generating, when located in their operating positions with respect to the room, in response to a first surround input signal and a second surround input signal, a first surround sound field and a second surround sound field at listening positions within the room, and means for coupling, including means for coupling said left and right sound channels, as said first and second input signals, to said loudspeaker means, said means for coupling said left and right sound channels including frequency response correcting means for correcting the frequency response of said left and right sound channels to compensate for errors that result from reproducing said large auditorium equalized sound information in said small room, and means for coupling said surround sound channel, said means for coupling said surround sound channel, deriving from said surround sound channel two surround signals which, when reproduced by said first and second additional loudspeaker means located in their operating positions with respect to the room, generate first and second surround sound fields having low-interaural cross-correlation with respect to each other at listening positions within the room, coupling said two surround signals to said first and second additional loudspeaker means, and including decorrelating means, said decorrelating means including means for shifting the pitch of said two surround signals with respect to each other.

40. The system of claim 39 wherein the sound information in said plurality of sound channels is carried in left total and right total signals, and said means for coupling includes decoding means for generating signals representing said left, right, and surround sound channels in response to said left total and right total signals.

41. The system of claim 40 wherein said left total and right total signals are processed by said frequency response correcting means before said signals are applied to said decoding means.

42. The system of claim 40 wherein said decoding means processes said left total and right total signals and said frequency response correcting means processes the multiple sound channel outputs of said decoding means.

43. The system of claim 39 wherein said first and second sound fields each have a direct sound field component and a diffuse sound field component, the direct sound field component of each said sound field being predominant over the diffuse sound component of said sound field at listening positions within the room, and said surround sound fields each have a direct sound component and a diffuse sound component, the diffuse sound component of each said surround sound field being predominant over the direct sound field component of said surround sound field at listening positions within the room.

44. The system of claim 43 wherein said characteristic response, subject to a tolerance of about ±1 dB up to about 10 kHz and about ±2 dB from about 10 kHz to 20 kHz, is:

| Hz | dB | Hz | dB |
|---|---|---|---|
| 20 | 0.0 | 5k | −1.1 |
| 100 | 0.0 | 6k | −1.8 |
| 500 | 0.0 | 8k | −2.8 |
| 1k | 0.0 | 10k | −4.2 |
| 2k | −0.2 | 12k | −5.2 |
| 3k15 | −0.4 | 16k | −5.4 |
| 4k | −0.7 | 20k | −5.7. |

45. The system of claim 43 wherein said means for coupling said surround channel to said additional loudspeaker means includes surround sound channel frequency response correcting means for correcting the frequency response of the surround sound channel to compensate for the listener perceived difference in timbre between the surround sound channel and the other sound channels.

46. The system of claim 43 wherein the frequency response of said surround sound channel frequency response correcting means, subject to a tolerance of about ±2 dB up to about 10 kHz and about ±4 dB from about 10 kHz to 20 kHz, is:

| Hz | dB | Hz | dB |
|---|---|---|---|
| 1000 | 0.0 | 5161 | −2.3 |
| 1163 | −1.5 | 5910 | −4.2 |
| 1332 | −2.4 | 6767 | −5.8 |
| 1525 | −2.2 | 7749 | −5.6 |
| 1746 | −1.7 | 8873 | −3.6 |
| 2000 | −1.3 | 10161 | −1.8 |
| 2290 | −2.6 | 11634 | −2.0 |
| 2622 | −2.7 | 13322 | 0.0 |
| 3002 | −3.2 | 15254 | +0.5 |
| 3438 | −5.0 | 17467 | +1.4 |
| 3936 | −4.3 | 20000 | −1.0 |
| 4507 | −2.8. | | |

47. The system of claim 39 wherein said system for reproducing the sound information contained in a plurality of sound channels is also for reproducing a center sound channel, said loudspeaker means generating, when located in its or their operating positions with respect to the room, in response to a further input signal, a further sound field at listening positions within the room, and said means for coupling also including means for coupling said center sound channel, as said further input signal, to said loudspeaker means, said means for coupling said center sound channel to said loudspeaker means including frequency response correcting means for correcting the frequency response of said center sound channel to compensate for errors that result from reproducing said large auditorium equalized sound information in said small room.

48. The system of claim 47 wherein the sound information in said plurality of sound channels is carried in left total and right total signals, and said means for coupling includes decoding means for generating signals representing said left, center, right, and surround sound channel signals in response to said left total and right total signals.

49. The system of claim 48 wherein said left total and right total signals are processed by the frequency response correcting means before said signals are applied to said decoding means.

50. The system of claim 48 wherein said decoding means processes said left total and right total signals and said frequency response correcting means processes the multiple sound channel outputs of said decoding means.

51. The system of claim 47 wherein said first, second, and further sound fields each have a direct sound field component and a diffuse sound field component, the direct sound field component of each said sound field being predominant over the diffuse sound component of said sound field at listening positions within the room, and said surround sound fields each have a direct sound component and a diffuse sound component, the diffuse sound component of each said surround sound field being predominant over the direct sound field component of said surround sound field at listening positions within the room.

52. The system of claim 51 wherein said means for coupling said surround channel to said additional loudspeaker means includes surround sound channel frequency response correcting means for correcting the frequency response of the surround sound channel to compensate for the listener perceived difference in timbre between the surround sound channel and the other sound channels.

53. The system of claim 52 wherein the frequency response of said surround sound channel frequency response correcting means, subject to a tolerance of about ±2 dB up to about 10 kHz and about ±4 dB from about 10 kHz to 20 kHz, is:

| Hz | dB | Hz | dB |
|---|---|---|---|
| 1000 | 0.0 | 5161 | −2.3 |
| 1163 | −1.5 | 5910 | −4.2 |
| 1332 | −2.4 | 6767 | −5.8 |
| 1525 | −2.2 | 7749 | −5.6 |
| 1746 | −1.7 | 8873 | −3.6 |
| 2000 | −1.3 | 10161 | −1.8 |
| 2290 | −2.6 | 11634 | −2.0 |
| 2622 | −2.7 | 13322 | 0.0 |
| 3002 | −3.2 | 15254 | +0.5 |
| 3438 | −5.0 | 17467 | +1.4 |
| 3936 | −4.3 | 20000 | −1.0 |

-continued

| Hz | dB | Hz | dB |
|---|---|---|---|
| 4507 | −2.8. | | |

54. The system of claims 43, 45, 46, 51, 52, or 53 wherein said frequency response correcting means comprises a circuit having a transfer characteristic of a filter with a shelving response such that its characteristic response is relatively flat up to about 4 or 5 kHz, rolls off between about 4 to 5 kHz and about 10 kHz, and is relatively flat above about 10 kHz.

55. A sound system for reproducing the sound information in a plurality of sound channels, including left, right, and surround sound channels, in a room, comprising loudspeaker means for generating, when located in its or their operating positions with respect to the room, in response to first and second input signals, first and second sound fields in which the direct sound field component of each sound field is predominant over the diffuse sound field component at listening positions within the room, additional loudspeaker means for generating, when located in its or their operating positions with respect to the room, in response to a third input signal, a third sound field in which the diffuse sound field component is predominant over the direct sound field component at listening positions within the room, means for coupling said left and right sound channels, as said first and second input signals, to said loudspeaker means, and means for coupling said surround sound channel, as said third input signal, to said additional loudspeaker means, said means for coupling said surround channel to said additional loudspeaker means including surround sound channel frequency response correcting means for correcting the frequency response of the surround channel to compensate for the listener perceived difference in timbre between the surround sound channel and the other sound channels, said surround channel frequency response correcting means having a frequency response, subject to a tolerance of about ±2 dB up to about 10 kHz and about ±4 dB from about 10 kHz to 20 kHz, of:

| Hz | dB | Hz | dB |
|---|---|---|---|
| 1000 | 0.0 | 5161 | −2.3 |
| 1163 | −1.5 | 5910 | −4.2 |
| 1332 | −2.4 | 6767 | −5.8 |
| 1525 | −2.2 | 7749 | −5.6 |
| 1746 | −1.7 | 8873 | −3.6 |
| 2000 | −1.3 | 10161 | −1.8 |
| 2290 | −2.6 | 11634 | −2.0 |
| 2622 | −2.7 | 13322 | 0.0 |
| 3002 | −3.2 | 15254 | +0.5 |
| 3438 | −5.0 | 17467 | +1.4 |
| 3936 | −4.3 | 20000 | −1.0 |
| 4507 | −2.8. | | |

56. The system of claim 55 wherein said surround channel frequency response correcting means includes decorrelating means for reducing the comb filter effect when the surround channel is reproduced by a plurality of loudspeaker means.

57. The system of claim 55 wherein the system is for reproducing said sound information in a relatively small room, such as in a home, said sound information is equalized for reproduction in a large auditorium whose room-loudspeaker system is aligned to a response curve having a high-frequency roll off, and said means for coupling said left and right sound channels to said loudspeaker means includes frequency response correcting means for correcting the frequency response of said left and right sound channels to compensate for errors that result from reproducing said large auditorium equalized sound information in said small room.

58. The system of claim 57 wherein said frequency response correcting means comprises a circuit having a transfer characteristic of a filter with a shelving response such that its characteristic response is relatively flat up to about 4 to 5 kHz, rolls off between about 4 to 5 kHz and about 10 kHz, and is relatively flat above about 10 kHz.

59. The system of claim 58 wherein said characteristic response, subject to a tolerance of about ±1 dB up to about 10 kHz and about ±2 dB from about 10 kHz to 20 kHz, is:

| Hz | dB | Hz | dB |
|---|---|---|---|
| 20 | 0 | 5k | −1.1 |
| 100 | 0 | 6k3 | −1.8 |
| 500 | 0 | 8k | −2.8 |
| 1k | 0 | 10k | −4.2 |
| 2k | −0.2 | 12k5 | −5.2 |
| 3k15 | −0.4 | 16k | −5.4 |
| 4k | −0.7 | 20k | −5.7. |

60. The system of claim 57 wherein said additional loudspeaker means includes first and second additional loudspeaker means, and said means for coupling said surround sound channel to said additional loudspeaker means further includes decorrelating means for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, and said means for coupling said surround sound channel to said additional loudspeaker means couples said two surround signals to said first and second additional loudspeaker means.

61. The system of claim 60 wherein said decorrelating means includes means for shifting the pitch of said two surround signals with respect to each other.

62. The system of claims 55 or 57 wherein said additional loudspeaker means includes first and second additional loudspeaker means, and said means for coupling said surround sound channel to said additional loudspeaker means further includes decorrelating means for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, and said means for coupling said surround sound channel to said additional loudspeaker means couples said two surround signals to said first and second additional loudspeaker means.

63. The system of claim 55 wherein said additional loudspeaker means includes first and second additional loudspeaker means, said means for coupling said surround sound channel to said additional loudspeaker means further includes decorrelating means for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, said means for coupling said surround sound channel to said additional loudspeaker means couples said two surround signals to said first and second additional loudspeaker means, and said decorrelating means includes means for shifting the pitch of said two surround signals with respect to each other.

64. The system of claim 55 wherein said system for reproducing the sound information in a plurality of sound channels is also for reproducing a center sound channel, said loudspeaker means generating, when located in its or their operating positions with respect to the room, in response to a fourth input signal a fourth sound field at listening positions within the room, and said means for coupling also coupling said center sound channel, as said fourth input signal, to said loudspeaker means.

65. The system of claim 64 wherein the system is for reproducing said sound information in a relatively small room, such as in a home, said sound information is equalized for reproduction in a large auditorium whose room-loudspeaker system is aligned to a response curve having a high-frequency roll off, and said means for coupling said left, center, and right sound channels to said loudspeaker means includes frequency response correcting means for correcting the frequency response of said left, center, and right sound channels to compensate for errors that result from reproducing said large auditorium equalized sound information in said small room.

66. A sound system for reproducing the sound information in a plurality of sound channels, including left, right, and surround sound channels, in a room, comprising loudspeaker means for generating, when located in its or their operating positions with respect to the room, in response to first and second input signals, first and second sound fields in which the direct sound field component of each sound field is predominant over the diffuse sound field component at listening positions within the room, additional loudspeaker means, for generating, when located in its or their operating positions with respect to the room, in response to a third input signal, a third sound field in which the diffuse sound field component is predominant over the direct sound field component at listening positions within the room, said additional loudspeaker means including first and second additional loudspeaker means, means for coupling said left and right sound channels, as said first and second input signals, to said loudspeaker means, and means for coupling said surround sound channel, as said third input signal, to said additional loudspeaker means, said means for coupling said surround channel to said additional loudspeaker means including surround sound channel frequency response correcting means for correcting the frequency response of the surround channel to compensate for the listener perceived difference in timbre between the surround sound channel and the other sound channels, and decorrelating means, including means for shifting the pitch of one signal with respect to the pitch of another, for deriving from said surround sound channel two surround signals which, when reproduced by said first and second additional loudspeaker means located in their operating positions with respect to the room, generate first and second surround sound fields having low-interaural cross-correlation with respect to each other at listening positions within the room, and coupling said two surround signals to said first and second additional loudspeaker means.

67. A decoder for use in a system for reproducing in a relatively small room, such as in a home, the sound information in a plurality of sound channels and carried in left total and right total signals, said plurality of sound channels including left, right, and surround sound channels, wherein said sound information is equalized for reproduction in a large auditorium whose room-loudspeaker system is aligned to a response curve having a high-frequency roll off, said system comprising loudspeaker means, including first and second surround loudspeaker means for reproducing the surround sound channel, comprising decoding means for generating left, right, and surround sound channel signals in response to said left total and right total input signals, frequency response correcting means for correcting the frequency response of at least said left and right sound channels to compensate for errors that result from reproducing said large auditorium equalized sound information in said small room, and decorrelating means for deriving from said surround sound channel two surround signals which, when reproduced by first and second loudspeaker means located in their operating positions with respect to the room, generate first and second surround sound fields having low-interaural cross-correlation with respect to each other at listening positions within the room, said decorrelating means including means for shifting the pitch of said two surround signals with respect to each other.

68. The decoder of claim 67 wherein said frequency response correcting means is further for correcting the frequency response of said surround channel to compensate for errors that result from reproducing said large auditorium equalized sound information in said small room.

69. A decoder for use in a system for reproducing in a relatively small room, such as in a house, the sound information in a plurality of sound channels and carried in left total and right total signals, said plurality of sound channels including left, center, right and surround sound channels, wherein said sound information is equalized for reproduction in a large auditorium whose room-loudspeaker system is aligned to a response curve having a high-frequency roll off, said system comprising loudspeaker means, including first and second surround loudspeaker means for reproducing the surround sound channel, comprising decoding means for generating left, center, right and surround sound channel signals in response to said left total and right total input signals, and frequency response correcting means for correcting the frequency response of at least said left, center, and right sound channels to compensate for errors that result from reproducing said large auditorium equalized sound information in said small room, and decorrelating means for deriving from said surround sound channel two surround signals which, when reproduced by first and second loudspeaker means located in their operating positions with respect to the room, generate first and second surround sound fields having low-interaural cross-correlation with respect to each other at listening positions within the room, said decorrelating means including means for shifting the pitch of said two surround signals with respect to each other.

70. The decoder of claim 69 wherein said frequency response correcting means is further for correcting the frequency response of said surround channel to compensate for errors that result from reproducing said large auditorium equalized sound information in said small room.

71. The decoder of claims 67, 68, 69, or 70 further comprising surround channel frequency response correcting means for correcting the frequency response of the surround channel to compensate for the listener perceived difference in timbre between the surround sound channel and the other sound channels.

72. A method for reproducing the sound information in a plurality of sound channels by means of at least one loudspeaker means in a relatively small room, such as in a home, wherein said sound information is equalized for reproduction in a large auditorium whose room-loudspeaker system is aligned to a response curve having a high-frequency roll-off, comprising deriving a signal from at least one of the sound channels, changing the frequency response of said signal to correct the frequency response errors that result from reproducing said large auditorium equalized sound information in said small room, the characteristic of the frequency response change of said signal being that of a filter with a shelving frequency response, being relatively flat below 4 to 5 kHz, rolling off between about 4 to 5 kHz and about 10 kHz, and being relatively flat above about 10 kHz, and coupling said frequency response corrected signal to at least one of the loudspeaker means.

73. The method of claim 72 wherein said characteristic of said frequency response change of said signal, subject to a tolerance of about $\pm 1$ dB up to about 10 kHz and about $\pm 2$ dB from about 10 kHz to 20 kHz, is:

| Hz | dB | Hz | dB |
|---|---|---|---|
| 20 | 0.0 | 5k | −1.1 |
| 100 | 0.0 | 6k | −1.8 |
| 500 | 0.0 | 8k | −2.8 |
| 1k | 0.0 | 10k | −4.2 |
| 2k | −0.2 | 12k | −5.2 |
| 3k15 | −0.4 | 16k | −5.4 |
| 4k | −0.7 | 20k | −5.7. |

74. A method for reproducing the surround sound channel in a sound system for reproducing the sound information in a plurality of sound channels by means of at least one loudspeaker means, said loudspeaker means including surround loudspeaker means, comprising deriving a signal from the surround sound channel, changing the frequency response of said signal to compensate for the listener perceived difference in timbre between the surround sound channel and the other sound channels, and coupling said frequency response changed signal to the surround loudspeaker means, the characteristic of the frequency response change of said signal, subject to a tolerance of about ±2 dB up to about 10 kHz and about ±4 dB from about 10 kHz to 20 kHz, being:

| Hz | dB | Hz | dB |
|---|---|---|---|
| 1000 | 0.0 | 5161 | −2.3 |
| 1163 | −1.5 | 5910 | −4.2 |
| 1332 | −2.4 | 6767 | −5.8 |
| 1525 | −2.2 | 7749 | −5.6 |
| 1746 | −1.7 | 8873 | −3.6 |
| 2000 | −1.3 | 10161 | −1.8 |
| 2290 | −2.6 | 11634 | −2.0 |
| 2622 | −2.7 | 13322 | 0.0 |
| 3002 | −3.2 | 15254 | +0.5 |
| 3438 | −5.0 | 17467 | +1.4 |
| 3936 | −4.3 | 20000 | −1.0 |
| 4507 | −2.8. | | |

75. The method of claim 74 wherein the sound system is for reproducing said sound information in a relatively small room, such as in a home, said sound information is equalized for reproduction in a large auditorium whose room-loudspeaker system is aligned to a response curve having a high-frequency roll-off, and the method additionally comprises changing the frequency response of said signal to correct the frequency response errors that result from reproducing said large auditorium equalized sound information in said small room.

76. The method of claim 75 wherein the characteristic of said additional frequency response change of said signal is that of a filter with a shelving frequency response, being relatively flat below 4 to 5 kHz, rolling off between about 4 to 5 kHz and about 10 kHz, and being relatively flat above about 10 kHz.

77. The method of claim 76 wherein said characteristic of said additional frequency response change of said signal, subject to a tolerance of about ±1 dB up to about 10 kHz and about ±2 dB from about 10 kHz to 20 kHz, is:

| Hz | dB | Hz | dB |
|---|---|---|---|
| 20 | 0 | 5k | −1.1 |

-continued

| Hz | dB | Hz | dB |
|---|---|---|---|
| 100 | 0 | 6k | −1.8 |
| 500 | 0 | 8k | −2.8 |
| 1k | 0 | 10k | −4.2 |
| 2k | −0.2 | 12k | −5.2 |
| 3k5 | −0.4 | 16k | −5.4 |
| 4k | −0.7 | 20k | −5.7. |

78. The method of claim 74 wherein the sound system is for reproducing said sound information in a relatively small room, such as in a home, said sound information is equalized for reproduction in a large auditorium whose room-loudspeaker system is aligned to a response curve having a high-frequency roll-off, and the frequency response of said signal is further changed to correct the frequency response errors that result from reproducing said large auditorium equalized sound information in said small room, the characteristic of the total frequency response change of said signal, subject to a tolerance of about ±2 dB up to about 10 kHz and about ±4 dB from about 10 kHz to 20 kHz, being:

| Hz | dB | Hz | dB |
|---|---|---|---|
| 1000 | 0.0 | 5161 | −3.8 |
| 1163 | −1.5 | 5910 | −6.0 |
| 1332 | −2.4 | 6767 | −7.9 |
| 1525 | −2.3 | 7749 | −8.1 |
| 1746 | −1.8 | 8873 | −7.1 |
| 2000 | −1.5 | 10161 | −6.1 |
| 2290 | −2.8 | 11634 | −6.9 |
| 2622 | −3.0 | 13322 | −5.2 |
| 3002 | −3.6 | 15254 | −4.7 |
| 3438 | −5.5 | 17467 | −4.1 |
| 3936 | −5.0 | 20000 | −6.7 |
| 4507 | −3.7. | | |

79. A method for reproducing the surround sound channel in a sound system for reproducing in a relatively small room, such as in a home, the sound information in a plurality of sound channels, the sound information being equalized for reproduction in a large auditorium whose room-loudspeaker system is aligned to a response curve having a high-frequency roll-off, the surround sound channel being reproduced by means of at least one loudspeaker means, said loudspeaker means including surround loudspeaker means, comprising deriving a signal from the surround sound channel, changing the frequency response of said signal to compensate for the listener perceived difference in timbre between the surround sound channel and the other sound channels, further changing the frequency response of said signal to correct the frequency response errors that result from reproducing said large auditorium equalized sound information in said small room, the characteristic of the further frequency response change of said signal being that of a filter with a shelving frequency response, being relatively flat below 4 to 5 kHz, rolling off between about 4 to 5 kHz and about 10 kHz, and being relatively flat above about 10 kHz, and coupling said frequency response changed signal to the surround loudspeaker means.

80. The method of claim 79 wherein said characteristic of said frequency response change of said signal, subject to a tolerance of about ±1 dB up to about 10 kHz and about ±2 dB from about 10 kHz to 20 kHz, is:

| Hz | dB | Hz | dB |
|---|---|---|---|
| 20 | 0.0 | 5k | −1.1 |
| 100 | 0.0 | 6k | −1.8 |
| 500 | 0.0 | 8k | −2.8 |
| 1k | 0.0 | 10k | −4.2 |
| 2k | −0.2 | 12k | −5.2 |
| 3k15 | −0.4 | 16k | −5.4 |
| 4k | −0.7 | 20k | −5.7. |

* * * * *

UNITED STATES PATENT AND TRADEMARK OFFICE
CERTIFICATE OF CORRECTION

PATENT NO. : 5,043,970

DATED : August 27, 1991

INVENTOR(S) : Tomlinson Holman

It is certified that error appears in the above-identified patent and that said Letters Patent is hereby corrected as shown below:

Column 09
Line 32 -- "of" should be --$f_0$--
Column 09
Line 32 -- "12.33" should be --12.31--
Column 09
Line 40 -- "of" should be --$f_0$--
Column 09
Line 40 -- "$\omega$" should be --$\omega_0$--
Column 12
Line 61 -- "as" should be --is--
Column 15
Line 09 -- "room-loudspeak" should be --room-loudspeaker--
Column 15
Line 61 -- "claim s" should be --claims--
Column 19
Line 07 -- "surround said channel" should be --surround sound channel--
Column 20
Line 14 -- "claim s" should be --claims--
Column 30
Line 08 -- "3k5" should be --3k15--

Signed and Sealed this

Twenty-sixth Day of January, 1993

*Attest:*

STEPHEN G. KUNIN

*Attesting Officer* *Acting Commissioner of Patents and Trademarks*